United States Patent
Fehr et al.

(10) Patent No.: US 9,569,743 B2
(45) Date of Patent: Feb. 14, 2017

(54) FUNNEL ANALYSIS

(71) Applicant: Verint Systems Ltd., Herzilya Pituach (IL)

(72) Inventors: Rahm Fehr, Tel Aviv (IL); Roni Romano, Even Yehuda (IL); Omer Ziv, Ramat Gan (IL)

(73) Assignee: VERINT SYSTEMS LTD., Herzilya Pituach (IL)

( * ) Notice: Subject to any disclaimer, the term of this patent is extended or adjusted under 35 U.S.C. 154(b) by 127 days.

(21) Appl. No.: 14/608,787

(22) Filed: Jan. 29, 2015

(65) Prior Publication Data

US 2015/0222752 A1    Aug. 6, 2015

Related U.S. Application Data

(60) Provisional application No. 61/934,317, filed on Jan. 31, 2014.

(51) Int. Cl.
*H04M 1/64* (2006.01)
*G06Q 10/06* (2012.01)
*G06N 5/02* (2006.01)

(52) U.S. Cl.
CPC .......... *G06Q 10/0637* (2013.01); *G06N 5/022* (2013.01)

(58) Field of Classification Search
CPC ...................... G06Q 10/0637; G06Q 10/06375
USPC .......................................... 379/88.01, 265.07
See application file for complete search history.

(56) References Cited

U.S. PATENT DOCUMENTS

| | | | | |
|---|---|---|---|---|
| 7,577,246 B2 * | 8/2009 | Idan | .................... | H04M 3/5175 379/265.01 |
| 9,313,332 B1 * | 4/2016 | Kumar | ................ | H04M 3/5232 |
| 2009/0292583 A1 * | 11/2009 | Eilam | .................... | G06Q 10/06 705/7.31 |

* cited by examiner

*Primary Examiner* — Van D Huynh
(74) *Attorney, Agent, or Firm* — Meunier Carlin & Curfman

(57) ABSTRACT

Systems, methods, and media for the application of funnel analysis using desktop analytics and textual analytics to map and analyze the flow of customer service interactions. In an example implementation, the method includes: defining at least one flow that is representative of a series of events comprising at least one speech event, at least one Data Processing Activity (DPA) event, and at least one Computer Telephone Integration (CTI) event; receiving customer service interaction data comprising communication data, DPA metadata, and CTI metadata; applying the at least one flow to the customer service interaction data; determining if the customer service interaction data meets the at least one flow; and producing an automated indication based upon the determination.

20 Claims, 6 Drawing Sheets

Automatized Call Scoring

| Initiatives | Definition | How scored | Appropriate on... |
|---|---|---|---|
| Customer stated intent to disconnect cable  7-1-13 | Did the customer say any of the magic words (cancel, disconnect, remove, competitor) to indicate they wanted to disconnect their cable service? | "Y" if customer indicated wanted to disconnect  "N" if customer made no request to disconnect  N/A is not an appropriate answer | Required on all calls scored in the following gates  • Multi Retention  • Cable Retention  • Vendors Multi Retention  • Vendors Cable Retention |
| Free receiver was the lead retention offer  7-1-13 | If the customer has requested to disconnect their cable was the Rep's lead offer to save the service by offering a free receiver.  Score YES if the receiver was the lead retention offer  Score NO if the receiver was not the lead retention offer | "Y" if free receiver was the lead retention offer  "N" if free receiver was not the lead retention offer  N/A if not appropriate | Required on all calls where the customer requested to disconnect their cable service |
| Free receiver was the fallback retention offer  7-1-13 | If the customer has requested to disconnect their cable was the Rep's secondary or any subsequent retention offer (anything but the lead offer) to save the service by offering a free receiver.  Score YES if the receiver was the secondary retention offer  Score NO if the receiver was not the secondary retention offer | "Y" if free receiver was the secondary retention offer  "N" if free receiver was not the secondary retention offer  N/A if not appropriate | Required on all calls where the customer requested to disconnect their cable service |

Fig. 5

FUNNEL ANALYSIS

RELATED APPLICATIONS

This application claims the benefit of U.S. Provisional Applications 61/934,317, filed Jan. 31, 2014, which is incorporated by reference in its entirety for all purposes.

BACKGROUND

The present disclosure relates to the field of automated data processing, and more specifically to the application of funnel analysis using desktop analytics and textual analytics to map and analyze the flow of customer service interactions.

An ontology is a formal representation of a set of concepts, and the relationships between those concepts in a defined domain. The ontology models the specific meanings of terms as they apply to that domain, and may be devised to incorporate one or several different spoken and/or written languages. Communication data may exist in the form of an audio recording, streaming audio, a transcription of spoken content, or any written correspondence or communication. In the context of a customer service interaction, the communication data may be a transcript between a customer service agent or interactive voice response (IVR) recording with a customer/caller. The interaction may be via phone, via email, via internet chat, via text messaging, etc. An ontology can be developed and applied across all types of communication data, for example, all types of customer interactions (which may include interactions in multiple languages), to develop a holistic tool for processing and interpreting such data.

SUMMARY OF THE DISCLOSURE

The disclosed solution uses machine learning-based methods to improve the knowledge extraction process in a specific domain or business environment. By formulizing a specific company's internal knowledge and terminology, the ontology programming accounts for linguistic meaning to surface relevant and important content for analysis. Based on the self-training mechanism developed by the inventors, the ontology programming automatically trains itself to understand the business environment by processing and analyzing a defined corpus of communication data. For example, the disclosed ontology programming adapts to the language used in a specific domain, including linguistic patterns and properties, such as word order, relationships between terms, and syntactical variations. The disclosed system and method further relates to leveraging the ontology to assess a dataset and conduct a funnel analysis to identify patterns, or sequences of events, in the dataset.

The premise on which the ontology is built is that meaningful terms are detected in the corpus and then classified according to specific semantic concepts, or entities. Once the main terms are defined, direct relations or linkages can be formed between these terms and their associated entities. Then, the relations are grouped into themes, which are groups or abstracts that contain synonymous relations. Relations are detected in interactions and surfaced during the system's self-training process. A theme is essentially a single concept defined by its associated relations, which represent that same concept among multiple interactions in the corpus. Themes provide users with a compressed view of the characteristics of interactions throughout the corpus. Themes may be identified according to the exemplary methods described herein.

Themes provide a basis for analytic functions of the ontological software, and these analytical functions can be performed automatically without the need for a user to provide detailed human oversight or involvement. For example, themes provide a basis for automatically analyzing conceptual patterns and/or sequences of events in a dataset. Once such sequences have been identified, the sequences can be further automatically analyzed to extract useful information about the sequences, such as data relating particular sequences to desired outcomes. In data relating to a call center environment, for example, call flows can be identified, which are sequences of conversation, or conversational topics, of interest to a user. In one exemplary analytical scenario, those sequences can be analyzed to determine how successful certain call sequences were at effectuating desired customer behavior, such as purchasing a new product or upgrading a service.

Speech or textual analysis can be leveraged by combining that analysis with other forms of metadata occurring sequentially or in conjunction with the communication, in the manners as disclosed herein. Such metadata can be acquired exemplarily through desktop analytics to identify Data Processing Activity (DPA) events occurring at the workstation of customer service agent. Additionally, Computer Telephone Integration (CTI) metadata can provide context to the communication data. CTI generally refers to the integration of the communication data platforms with the databases and computer systems that operate them. Such systems integrate voice, email, internet data, etc. massaging of CTI metadata include, but are not limited to call transfers (e.g. where customer call came from or transferred to), voicemail, interactive voice response (IVR) message, or if a customer was placed on hold.

Prior art data analysis systems and methods require manual data analysis to determine context and identify contextual patterns. For example, in a call center environment, calls are typically analyzed manually by a user listening to the call to determine the tone, context, and resulting success of the call. In one exemplary situation, prior art systems and software for analyzing call center data to assess the success of retention attempts by customer service representatives to retain customers who call intending to discontinue a product or service require a user to listen to calls, or portions of calls, to determine how the representative attempted to retain the customer and the success of that attempt. Currently, large companies have teams of people manually reviewing data to assess such call flows and success/failure rates. The present software system and method provides such call flow and success rate analysis automatically and without the need for users to engage in the time consuming and laborious process of manually reviewing data. Further, the present system and method can quickly and easily provide comprehensive analytical data regarding an entire data set, or any subset thereof, including resource allocation and the dollar value associated with particular methods or actions, to determine successful and cost effective practices within a user company. Thereby, companies can maximize their resources. For instance, again assessing a call center example, a company can utilize the present systems and methods to drive down the cost of running the call center while maximizing the profit that can be made therefrom.

BRIEF DESCRIPTION OF THE DRAWINGS

FIG. 5 provides an exemplary logic table demonstrating one embodiment of an analytics module applying a funnel analysis.

DETAILED DISCLOSURE

In the field of automated analysis of communication data, an exemplary embodiment as used herein includes interpersonal communication data, which may exemplarily be communication data of a customer service interaction between a customer service agent and a customer. In embodiments, communication data may be recognized as either audio or textual data which may be processed and analyzed in real-time (as in the case of streaming audio data) or processed at a time apart from the acquisition of the communication data. In some embodiments, it is recognized if the communication data is audio data, then the audio data, may undergo a transcription, which may employ the exemplary technique of large vocabulary continuous speech recognition (LVCSR) or other known speech-to-text algorithms or techniques. Alternatively, the communication data may already be in the form of a transcription or the communication data may have originated as textual data, exemplarily the communication data is from an internet web chat, email, text message, or social media.

Figure 1:
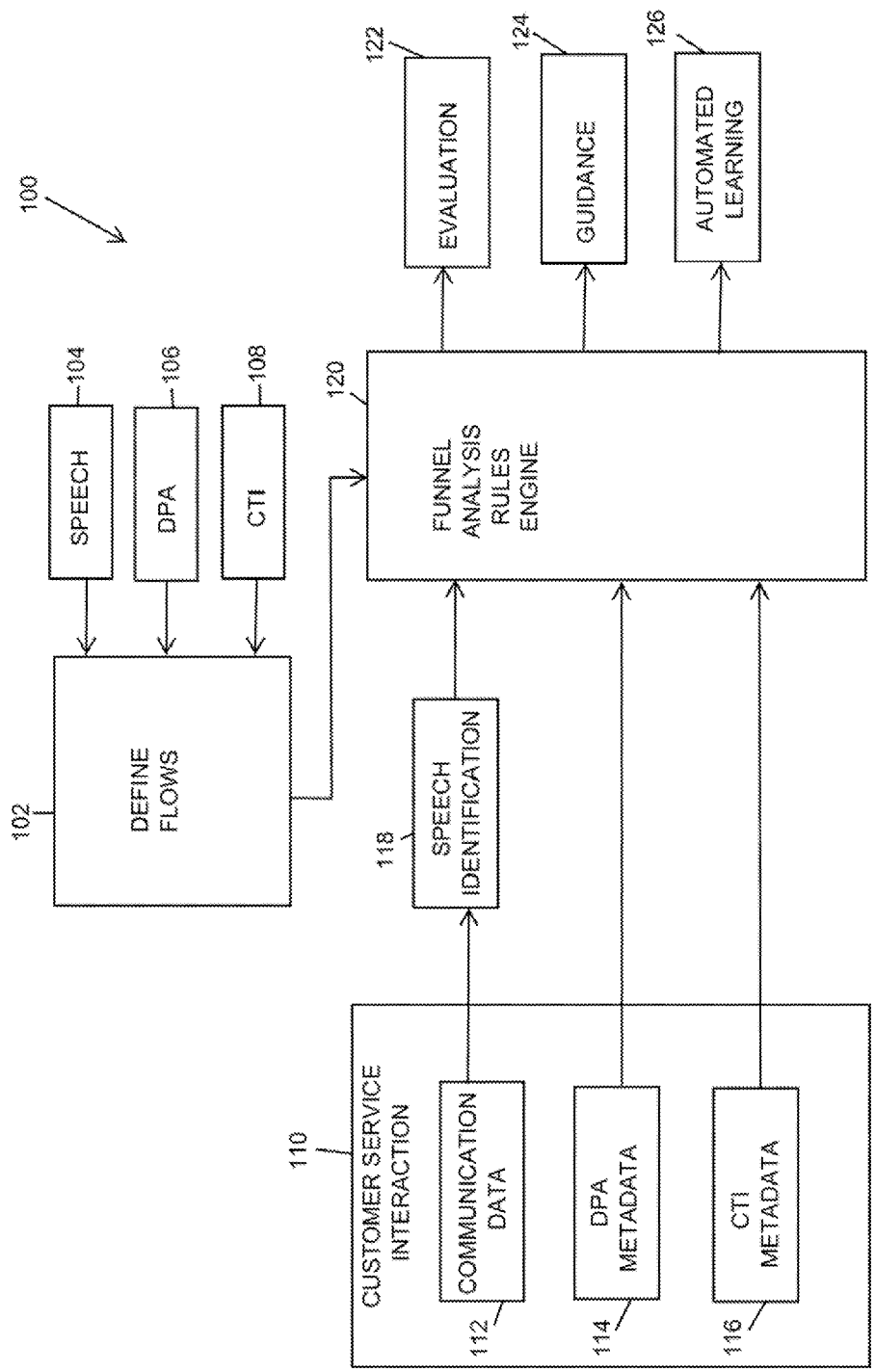
FIG. 1 is a schematic diagram of an exemplary embodiment of a method of funnel analysis.
Figure 2:
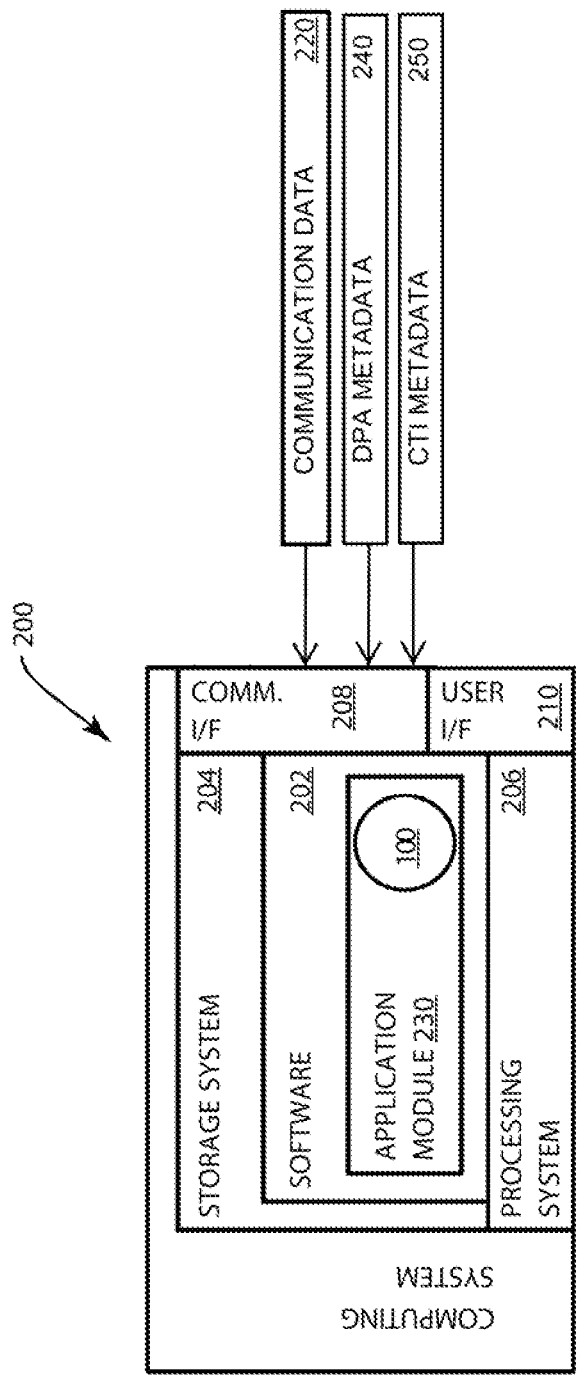
FIG. 2 is a system diagram of an exemplary embodiment of a system for automated funnel analysis.

FIG. 1 is a flow chart that depicts an exemplary embodiment of a method 100 of funnel analysis. FIG. 2 is a system diagram of an exemplary embodiment of a system 200 for automated funnel identification. The system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in herein in further detail in accordance with the method 100.

Although the computing system 200 as depicted in FIG. 2 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description.

The processing system 206 can include a microprocessor and other circuitry that retrieves and executes software 202 from storage system 204. Processing system 206 can be implemented within a single processing device but can also be distributed across multiple processing devices or subsystems that cooperate in existing program instructions. Examples of processing system 206 include general purpose central processing units, application specific processors, and logic devices, as well as any other type of processing device, combinations of processing devices, or variations thereof.

The storage system 204 can comprise any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable, of communicating with the processing system 206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media a propogated signal.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 210.

As described in further detail herein, the computing system 200 receives communication data 220. The communication data 220 may exemplarily be a text file and may exemplarily be a transcription of a conversation or interaction which may exemplarily be between two speakers, although the transcription may be of any of a variety of other interactions, including multiple speakers, a single speaker, or an automated or recorded message. In a further exemplary embodiment, the communication data is of a customer service interaction between a customer and a customer service agent. In another embodiment, the communication data 220 is text data from web chat, email, or social media.

In still further embodiments, the communication data 220 may be audio data that can be transcribed by the computing system 200. In such embodiments, the processing system 206 may be capable of performing a transcription of audio data, exemplarily by applying large vocabulary continuous speech recognition (LVCSR) speech-to-text algorithms. The audio data may exemplarily be a .WAV file, but may also be other types of audio files, exemplarily in a pulse code modulation (PCM) format and an example may include linear pulse code modulated (LPCM) audio file. Furthermore, the audio file may exemplary be a mono audio file; however, it is recognized that in embodiments the audio file may alternatively be a stereo audio file. In still further embodiments, the audio file may be streaming audio data received in real time or near-real time by the computing system 200.

Figure 3:
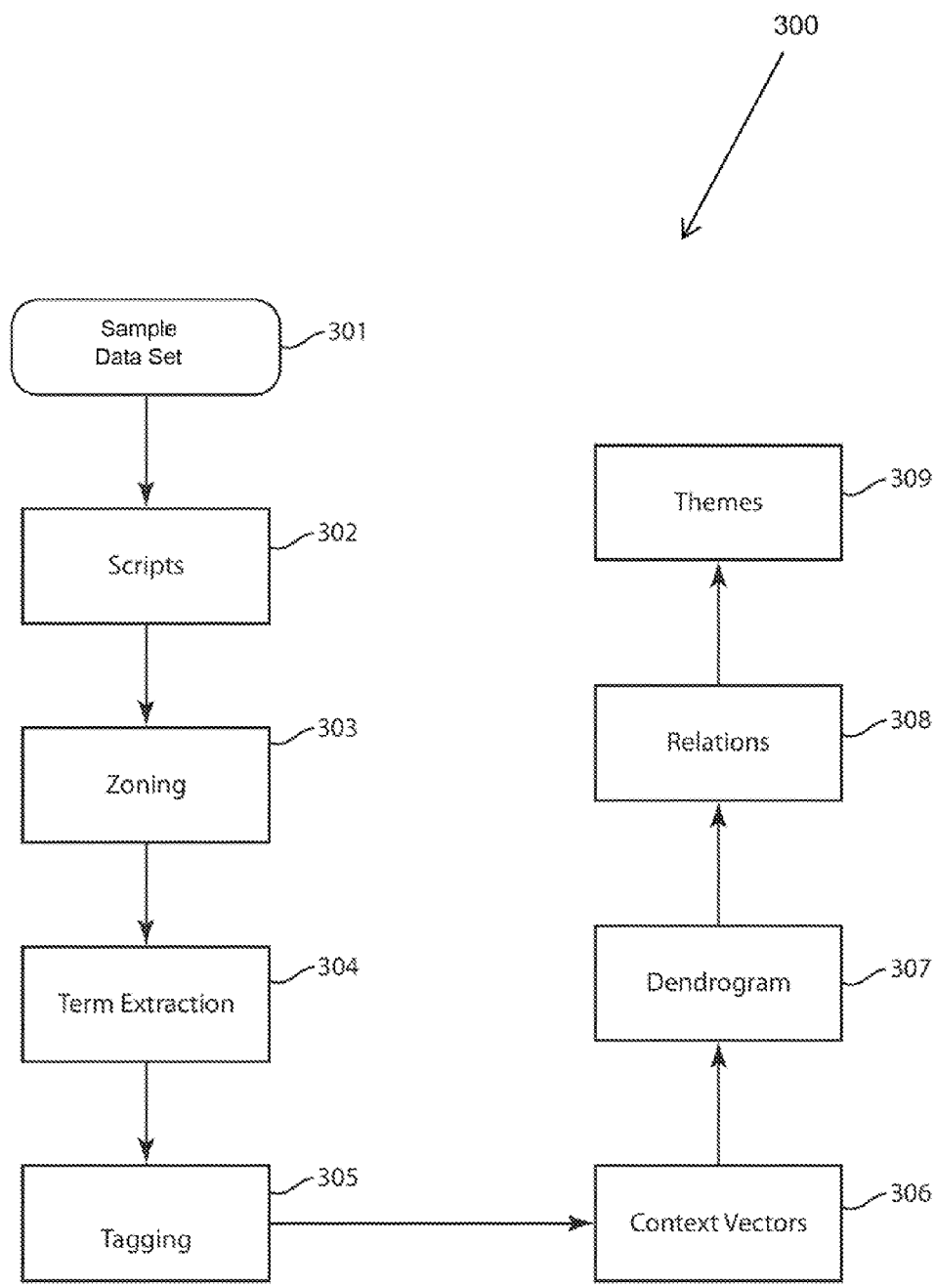
FIG. 3 is a schematic diagram of an embodiment of a process for surfacing themes.
Figure 4:
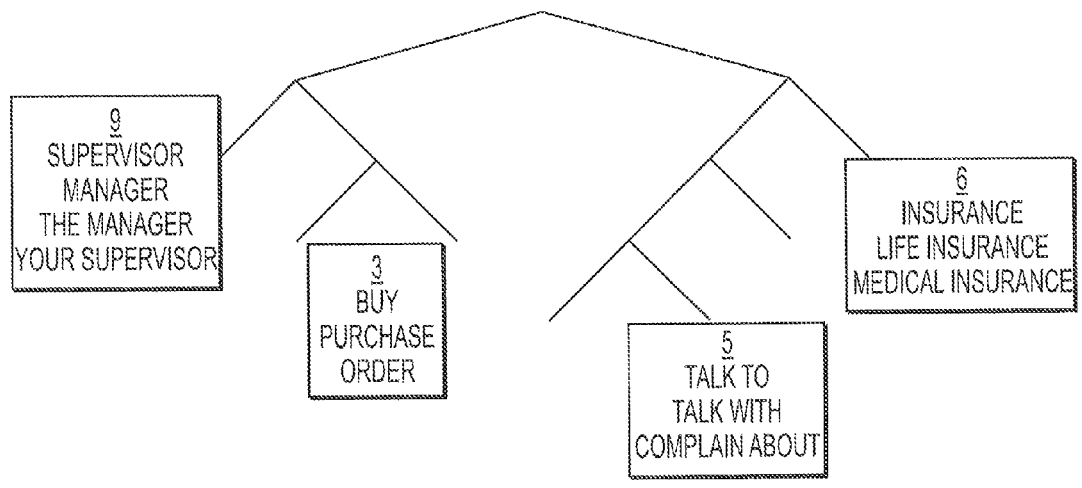
FIG. 4 depicts an exemplary embodiment of a dendrogram.

FIG. 3 is a schematic diagram of an embodiment of a method of surfacing themes 300. In the exemplary embodiment of FIG. 3, the themes are surfaced from a sample data set 301. The sample data set 301 may include an accumulation of a range of communication data. The communication data required for this purpose may originate from different time periods, for example, within about a month previous to the date of implementing the training step. The data is validated and gathered from different types of defined sources.

At step 302 scripts are identified within the sample data set 301. Scripts are lengthy, repeated patterns that appear in the data set 301. For example, a standard phrase spoken by a customer service agent, such as "Hello, how can I help you?" may comprise a script. Next, the process of zoning 303 segments conversations within the data set into meaning units. Meaning units are sequences of spoken words that express an idea, such as may be the equivalent of sentences. An example of a meaning unit in a customer service context would be the customer statement, "I would like to buy a phone."

After the zoning process has been completed at 303, terms are extracted at 304 from each of the meaning units. Term extraction 304 is a process that reviews all of the meaning units and extracts the terms that are meaningful in a corpus. A term is a short list of words (e.g. between 1 and 5 words) that has a precise meaning, or a meaning that stands out in its context. For example, "credit card" and "your account number" could both be appropriate terms. Next, at 305 the terms are tagged. Terms are tagged at 305 in such a way that any overlapping terms are tagged in a non-overlapping way. Longer terms are generally preferred over shorter ones. For example, the term "my phone number" is counted as one term, rather than two—i.e. "my phone" and "number."

At 306, context vectors are identified. Context vectors 306 are linkages between defined terms in the corpus, or data set, and the words that appear before or after each term. For example, the term "account" could be preceded by any of several terms, such as "have an," "to your," "a prepaid," "cancel my," or "my husband's." Likewise, the term "account" could be followed by any number of terms, such as "holder's", "receivable", or "been canceled." These so called left and right context vectors contain the predictive words for a main term, also referred to as a pivot term.

Identifying context vectors 306 forms the basis for the next step, building dendrograms 307, which is building a hierarchical clustering of terms. The training system uses the premise that terms that share contextual similarity and have similar linguistic characteristics also share the same general meaning. In other words, terms with similar context vectors may be synonyms (e.g., purchase/buy), conceptually interchangeable (e.g., days, dates, locations), ontologically similar (e.g., financial transactions). Terms that share these characteristics are good candidates to be inserted in the ontology as a group of terms with similar meanings. In order to accomplish that, the system scans the context vectors of all terms created in the previous phase and clusters together terms with similar context vectors. A dendrogram, for example, may center around the term "purchase." The left context vector (preceding term) may be "want to", "need to", etc. While the right context vector (following term) may be "an i-phone", "the service", "high-speed internet." Initially, all detected terms in the corpus are located with similar terms in clusters on the dendrogram. Then, the dendrogram is transformed into a contextual similarity tree that only contains the stronger similarity clusters of the original dendrogram based on a similarity score algorithm that scores the similarity of the terms in the associated context vectors. During this transformation process, some terms are eliminated and some are grouped or merged with other meaningful terms. Preferably, the minimum number of terms in a dendogram cluster is four, in order to provide a meaningful analysis of the grouped terms. By way of example, the following terms "purchase" and "buy" have similar context vectors:

| Term: Purchase | Left Context Vector (Before Term): | Want To, Need To, Have To |
|---|---|---|
|  | Right Context Vector (After Term): | An i-Phone, The Service, High-Speed Internet |
| Term: Buy | Left Context Vector (Before Term): | Want To, Need To, Must |
|  | Right Context Vector (After Term): | i-Phone, High-Speed Internet, A Service That |

These two terms would be combined into one dendrogram cluster. The ontological premise is that there is a contextual similarity between these terms and therefore, they are clustered together. A set of dendrogram clusters can be presented as a hierarchical structure, such as a tree structure, where terms and clusters that are related are placed near one another in the structure.

After the dendrogram 307 development, relations 308 are developed within the sample data set 201. Relations 308 are linkages or relationships between the defined terms in the corpus. For example, "cancel>account," "speak with>supervisor," and "buy>new iPhone" are exemplary relations 308. The system defines a concise number of strong, meaningful relations according to certain pre-defined policies or rules. Those strong relations are given a higher score, and thus are given preference over other, lower-scoring relations.

Then, based upon the established relations 308, the system identifies, or surfaces, themes 309 appearing within the dataset. Themes 309 are groups or categories of relations that are similar in meaning. A theme 309 represents a concept and is defined by its associated relations. A theme encapsulates the same concept among several interactions. Themes 309 allow users to easily and efficiently understand the characteristics of interactions throughout the corpus. For example, the theme "got an email" might correspond to several relations, including "got the email," "got confirmation," "received an email," "received an email confirmation," etc. In a call center data set, for example, one theme may represent a concept expressed in several different calls. In that way, a theme can provide a summary, or a compressed view, of the characteristics of the interactions in a communications data set. Preferably, a relation is assigned to only a single theme.

Specifically, in one embodiment, themes can be identified using the following algorithm, or method. First, the term pairs, or relations, in a corpus are scored according to the following algorithm:

$$\text{score}(term1, term2) = \frac{\text{joint\_count}(term1, term2) \times \text{length\_in\_letters}([term1\ term2])}{\text{average\_distance}(term1, term2) + 1}$$

In the above algorithm, "joint count" represents the number of times the terms appear together in the specified order in the dataset (or a designated subset of the dataset), the "length in letters" represents the length of the words (letters or characters), taken together, in the term set (or relation). Those numbers are multiplied together and divided by the "average distance" between the terms plus 1. The average distance may be calculated as the average number of words that appear between the two terms. Alternatively, the average distance could be calculated as the average number of letters or characters between the two terms. Strong, or high scoring, term sets are those that are long (have many letters) with high appearance count and that appear close together. Low scoring term sets are short, appear infrequently, and are far apart in the data set (indicating loose context). High scoring term pairs, or relations, are valued over low scoring pairs.

After the relations, or term pairs, are scored, the relations are listed in descending order based on that score. That list of scored relations is then truncated so that only a certain number of top scoring relations are maintained. For example, the list may be truncated to retain a pre-defined constant number of relations. Alternatively, a predefined percentage of the relations may be kept. Before or after the list is truncated, the scores for each of the relations in the list may be normalized by assigning them a new score according to their rank in the list. Preferably the score is normalized in descending order, with the best pair (highest scoring term pair) receiving the highest normalized score and the worst pair (lowest scoring term pair) receiving the lowest normalized score.

Then, for each term of each relation in the list, the corresponding dendrogram cluster, or parent node, if it exists, is identified. If found, the term pair is assigned to the identified dendrogram nodes pair, and a list of nodes is developed. Relations, or terms pairs, belonging to the same nodes pair can be grouped together. For example, as seen in FIG. 3, each dendrogram cluster receives a node number. Each term pair is then correlated with its corresponding node, or dendrogram cluster, pair. For instance, in FIG. 3 the term pair buy>insurance and order>life insurance both correlate to the node pair 3>6. Accordingly, those term pairs could be grouped together and identified according to their node pair.

As is also illustrated in FIG. 3, some terms may not correspond to any dendrogram cluster and thus may not have a corresponding node number. For example, in FIG. 3 the term pair talk to>a principal, the term "a principal" was not identified as being associated with any dendrogram cluster and thus did not receive a node number. In those instances node numbers may still be identifiable, or associatable, if the unassociated or un-grouped terms can be affiliated with node pairs or dendrogram clusters having textually similar terms. Such affiliation can be assessed by using character trigram similarity, which compares the literal similarity between the words in two separate relations or terms. Character trigram similarity assesses the similarity of words by assessing the words in the terms together, and specifically by comparing the letters of each of the words in each of the relations with one another. One way to do that is by parsing the relations or terms into letter triplets and determining whether those letter triplets appear in each relation or term. The character trigram similarity of two terms can be assessed according to the following algorithm:

$$\text{similarity}(a, b) = \frac{\sum_{\text{trigram } t \in a,b} \min(\text{count of } t \text{ in } a, \text{count of } t \text{ in } b)}{\text{number of trigrams belonging to } a + \text{number of trigrams belonging to } b}$$

In this way, the letter strings in each term are compared and their similarity is determined. Terms that have sufficiently similar letter strings in them are grouped together, for example in the same dendrogram cluster, or node. Thereby, previously unassociated terms can be placed into a group.

Preferably, the themes are expanded to incorporate as many of the identified terms and relations as possible. Since data sets may commonly be derived from speech-to-text translation algorithms, and because those algorithms are imperfect and often make slight mistranscriptions, it is desirable to use algorithms that can associate textually similar terms together—e.g., managers and manager, Sunday and Monday. Thus, as described above, unassociated relations can be assimilated into the established node groupings by comparing them with the already-grouped relations, for example using character trigram similarity. For relations that remain unassociated after such a comparison with the already-grouped relations, additional associations can be made by comparing the unassociated relations with one another. For example, the character trigram similarity algorithm can be used to compare and group the unassociated relations with one another. In some embodiments, the threshold for clustering or grouping these previously unassociated relations may be higher than the threshold for grouping the unassociated relations with the already-grouped relations. After all comparisons are completed, relations whose terms do not have any similarity linkages to other terms and thus cannot be clustered with other relations, are discarded as unimportant Once all of the terms are placed into node number pairs or are discarded as unimportant, the remaining list of node number pairs indicates groups of term pairs. This list could appropriately be termed a list of "theme candidates" because it contains groups of relations that could potentially be identified as themes. The list of theme candidates can be paired down using any number of techniques. For example, the theme candidates can be scored by averaging the scores (or normalized scores) of its original term pair members. Alternatively or additionally, the list of theme candidates can be compared to a pre-created, or "canned", list of important terms or themes. The "canned" list can be one that is created based on similar datasets, for example based on datasets belonging to another user in the same or similar industry. The theme candidates that appear on the "canned" list of important themes or terms could then be elevated as important, or high scoring, themes. Likewise, the list of theme candidates could be compared to a "canned" list of unimportant terms. The theme candidates that appear on the list can be removed, and purged because they are insignificant and do not add anything to the analysis. Additionally, the theme candidates could be scored based on their number of members, with the candidates having the most members receiving the highest score. The theme candidates can also be scored according to their entity consensus, where themes having terms that belong to the same entity or groups of entities are scored higher than those with terms belonging to disparate entities. Another scoring means is by diversity, where themes with a greater number of unique terms on either side of the relations receive a higher score. Further, the list of theme candidates can also be refined by a user, for example, at the ontology administration stage 2. In one embodiment, the theme candidates are scored according to a number of different metrics, such as those listed above, and then the scores are added together or averaged to calculate a final score. The theme candidates with the highest final scores can then be classified or identified as themes and used as a foundation for the analytics structure.

Additionally, as will be described herein in further detail, speech can be combined with metadata embodying data processing activity (DPA) and computer telephone integration (CTI) and can be used by analytic algorithms to identify larger events, or flows, which can be identified by a series of data events (speech, DPA, and CTI) appearing in an identifiable order. This series of data event patterns represent courses of action or a series of events. In one embodiment, a funnel analysis may begin by identifying a specific triggering data event, and then assess differing patterns that flow from that triggering data event. In this funnel analysis, identification of the triggering event and identification of the resulting patterns can both be achieved by locating certain patterns of speech, DPA, and CTI. The embodiments of the funnel analysis can be quite specific, allowing the system to single out specific data events, and automatically identify one or more resultant patterns that follow that specific data event. Once the data event patterns have been identified, a user can leverage the system to analyze the effectiveness of each of a plurality of related data event patterns. Additionally or alternatively, embodiments automatically use the funnel analysis to examine datasets to determine, for example, the percentage of calls include certain data events e.g. what percent of the dataset went through which funnels. Likewise, the system may utilize the funnel analysis to assess particular subsets of data, such as data from a certain time period or involving a particular individual or entity, to automatically obtain desirable information.

For example, in a call center application, application of the method as disclosed herein can enable companies to automatically assess large datasets to obtain important statistical data about call patterns. The system can identify particular events initiated by a customer and/or a customer service agent and then assess how those events are being handled and the success rates and outcomes of the different resultant patterns, or courses of action. For example, call flows can be identified in the dialogue between a customer service representative and a customer by identifying speech, DPA, and CTI in the communication data and metadata acquired during/from a customer service interaction (e.g., discussions regarding cancelling a service, discussions regarding a billing error, discussions regarding upgrading or changing a service). The funnel analysis will automatically assess multiple calls involving an identified or selected data event or events. The communication data and metadata may then be processed to determine useful information, such as which interactions had successful outcomes and which ones did not. For example, the system may identify customer service interactions wherein the customer requests to cancel their service by identifying call data wherein particular related themes appear, such as cancel>service, stop>service, cancel>plan, leave>company, etc. Then, once those customer services calls have been identified, the system may identify, for example, which approaches by customer service agents resulted in retaining the customer.

In one embodiment, the identified data sets including the triggering data event can be assessed to determine what caused the data event, what actions followed from the data event, and/or what conclusion or result flowed from the triggering data event. Following on the above explanatory example, call sets containing themes regarding cancelling a service can be assessed and further separated based on, for example, what caused the customer to want to cancel the service, what course of action the customer service agent took in response to the customer's cancellation request, and/or how the interaction resolved—e.g. whether the customer successfully cancelled the service or decided to continue the service instead. For example, a company that offers cable service may wish to identify and assess calls relating to customer requests to cancel their cable service to determine what actions by customer service agents successfully caused such customers to change their mind and keep their service. For example, the system might identify theme patterns relating to particular financial incentives, such as offering of free services or equipment. Likewise, the system might identify other theme patterns relating to identification of the reason for cancellation, and/or themes relating to proposals or solutions for counteracting the customer's dissatisfaction.

Patterns, or flows of data events can be identified using a funnel analysis, where the system reviews a user's dataset to identify subsets of data that have at least a threshold degrees of similarity in their data event patterns.

FIG. 1 is a schematic diagram of an exemplary embodiment of a method 100 of funnel analysis. Embodiments of the method 100 combine desktop analytics and speech analytics to more accurately map the flow of a customer service interaction by combining speech data event with metadata data events. At 102 flows are defined using data events selected from each data events 104, data processing activity at 106 and computer telephone integration (CTI) data events 108. Speech data events may exemplarily be themes as discussed above; however, the speech data events 104 may be defined as any of the speech analytics, units or components as disclosed herein, exemplarily terms, relations, meaning units, or context vectors. The data processing activity (DPA) data events may be defined by metadata from the customer service agent's workstation, which may exemplarily include the access of a particular screen, file, program, or application within the customer service agent's workstation environment. Such features may be specifically related to a particular type of data of information, exemplarily customer identification, package or product details, currently available offers or promotions, credit card details, or transaction processing. The customer telephone integration (CTI) data events 108 include metadata that is related to communication or data processing performed by the customer service agent's workstation. Such action may include the transfer of a call to a manager or to another customer service agent, the transfer of the call to a voicemail mailbox, the initiation or conclusion of an interactive voice response (IVR) message, or placing the customer on hold. It will be understood that the above examples of data events are merely exemplary and are not intended to be limiting on the scope of such data events as may be used to define one or more funnels at 102.

The flows defined at 102 comprise a series of data events selected from the speech data events 104, DPA data events 106, and CTI data events 108. Typically, each defined flow begins with a triggering event. Typically, the triggering event will be representative or indicative of the subject of interest be explored by the defined flow. Non-limiting examples of flows may seek to define process for retention, incoming sales, formal complaints, identification or verification, service or product upgrades, or web site comments, although it will be recognized that any other products or subjects may be of interest and may be the basis for a defined flow. The defined flow, similarly end with a data event representative of an outcome or resolution related to the subject of interest. In the example of a customer retention flow, the data events may exemplarily begin with a triggering DPA data event of access of a "closed account" screen. The defined flow may then continue with an identification of speech event of a retention offer, then may exemplarily be followed by a CTI data event of transferring the call to a manager or supervisor.

The method 100 requires a customer service interaction 110 to analyze. While for the sake of simplicity, a single customer service interaction is used to descriptive purposes, it will recognized that in alternative embodiments, particularly those embodiments directed towards automated investigation of topics, trends, or issues, a large number of customer service interactions compiled as a data set would be analyzed using the techniques as disclosed herein.

The customer service interaction 110 includes communication data 112, which as described above, may be an audio recording, streamed audio, or textual data obtained by automated transcription or through written communication. Customer service interaction 110 further includes DPA metadata 114 acquired from the customer service agent's workstation and CTI metadata 116 which may be acquired from the customer service agent's workstation or the communications IT system employed by the customer service center in which the customer service agent is working. It will be recognized that even in an embodiment wherein a large number of customer service interactions are displayed in a dataset, the communication data 112, DPA metadata 114, and CTI metadata 116 is for a single customer service interaction being stored in association or together for analysis as a whole.

As noted above, the flows may be defined using any of a variety of types of speech event data, exemplarily the speech event data are themes. The communication data 112 must undergo speech identification at 118 in order to identify the speech event data type as used to define the flow. Therefore, in the exemplary embodiment, the speech identification at 118 identified all of the themes in the communication data 112. At 120 the defined flows from 102 are provided to a funnel analysis rules engine 120. The communication data as processed by the speech identification 118, the DPA metadata 114, and the CTI metadata 116 are all provided to the funnel analysis rules engine 120. The funnel analysis rules engine 120 applies the defined flows to the received data in order to achieve a number of different types of data analysis outcomes. In exemplary embodiments, the defined flows each represent a particular result and therefore the funnel analysis rules engine operates to identify which of the defined flows matches the received data. In still further embodiments, a preferred, or expected flow is applied to the customer service interaction data in order to make a determination as to whether the preferred flow or expected flow occurred.

Various outputs or automated actions or responses may be taken based upon the application of the defined flow to the customer service interaction data by the funnel analysis rules engine. This may include producing an evaluation 122 of the customer service interaction, or the customer service agent in the way that customer service interaction is held. In such an evaluation at 122, the defined flows may represent company policy or agreed upon best practices, and therefore are the regarded customer service interactions will incorporate the flows or even preferred variation of the defined flows.

The identification or non-identification of defined flow in the customer service interaction data may result in automated guidance at 124. Such automated guidance may be provided in real-time or non-real-time data analysis embodiments. In a real-time embodiment, the guidance may be presented at a moment that the customer service agent is determined to have gotten off of a defined flow, identified as the best practice, and the customer agent is provided with guidance to correct this error, or to get back on track. In a non-real-time embodiment, the guidance may come to the customer service agent after a periodic review of the customer service interactions of that agent.

At 126, the results of the application of the defined flow to the customer service interaction data may be used to facilitate automated learning processes as described herein, exemplarily by defining flow segments in the customer service interaction data to identify which defined flow or partial flow occurred in the customer service interaction data. As described herein, further segmentation or definition of customer service interaction data can facilitate further surfacing of trends, issues, or new best practices by evaluating the data of multiple customer service interactions, particularly those that contain the same flow, or contain flows that start with the same triggering events or include the same resolution or output.

FIG. 5 provides an abbreviated logic grid for an exemplary funnel analysis related to this exemplary customer service assessment. As described above, the ontology system would be leveraged to process the company's customer service data to identify datasets involving themes relating to canceling service. Referring to the figure, step 501 is identifying data subsets containing a customer states an intent to disconnect can be done by identifying particular themes involving cancelling. Then, the communication interactions, or data subsets, containing the identified theme may then be further analyzed to identify other themes that followed from the triggering theme. At 502, for example, the system assesses the identified interactions to determine whether the customer service agent offers a "free receiver" as the first reaction to the customer's cancellation request. Likewise, at 503, the system analyzes whether the agent offers a "free receiver" as the second, or "fallback", reaction.

Accordingly, data subsets having the same patterns, or series, of themes are funneled together. For instance, in the provided example, groups of data wherein the customer seeks to cancel their cable and then the customer service agent offers a "free receiver" as the first reaction can be grouped and assessed together. This allows for analytics to be performed on the similar data subsets so that a user can collect useful metrics. Following on the example, the user could assess the "free receiver" data group to determine the success rate of that offer in retaining customers—i.e., what percentage of customers change their mind regarding cancellation after being offered a free receiver.

Figure 6:
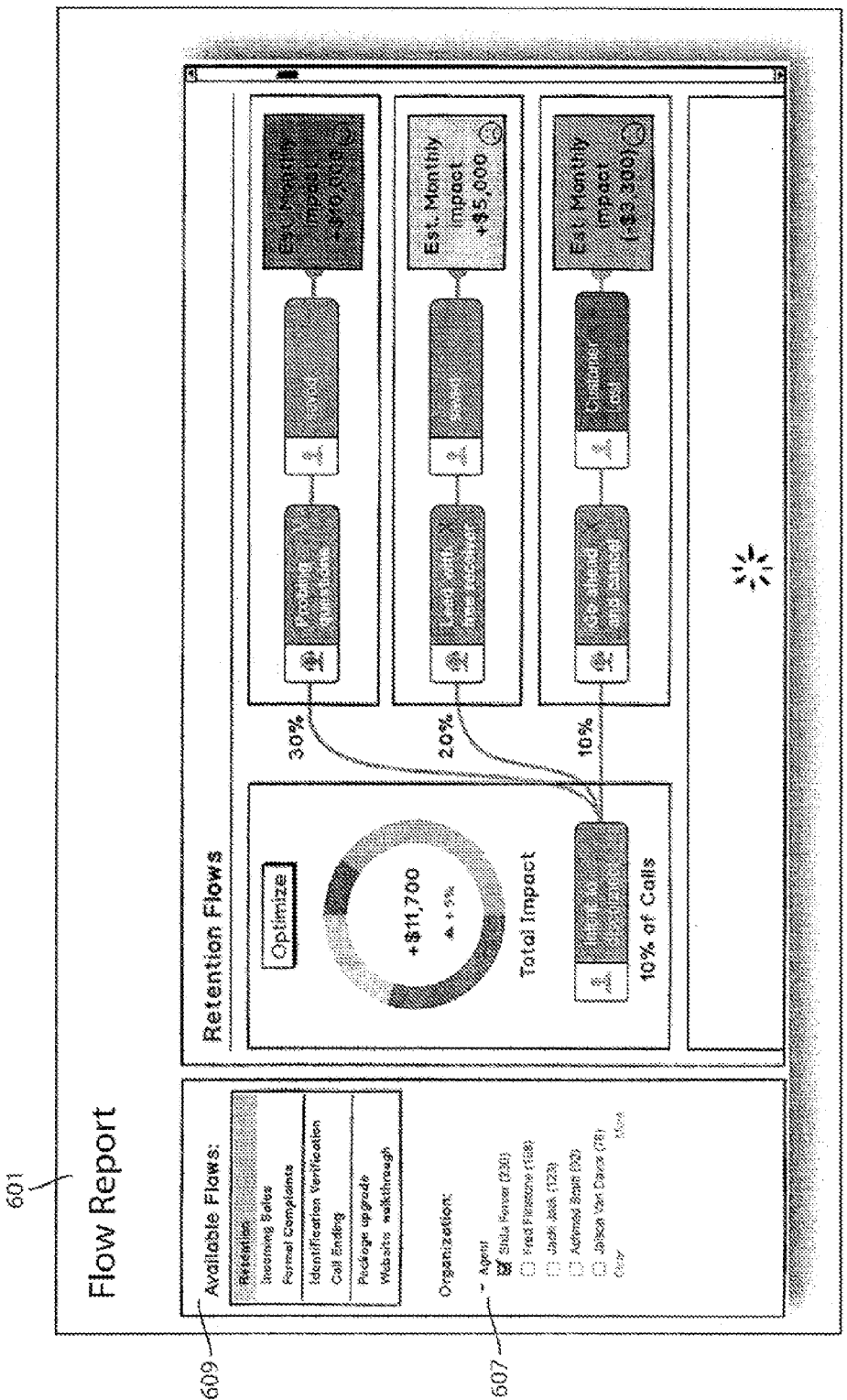
FIG. 6 provides an exemplary user interface display providing the results of one embodiment of an analytics module applying a funnel analysis.

This type of inquiry can be conducted regarding any identified triggering theme, or event, for any dataset to identify a theme pattern, or flow of events, for each interaction. The interactions can then be grouped and other statistical and or data assessments can be performed to report a multitude of useful data according to the users' needs. Sticking with the same example, FIG. 6 demonstrates one potential output to a user that could be provided by an analytics module or program utilizing a funnel analysis, such as the analysis depicted in FIG. 6. The depicted user interface is a flow report 601 that conveys data regarding the interactions, or flows, that followed after a customer expressed an "intent to disconnect." This flow report 601, titled "Retention Flows", displays statistical data regarding three courses of action taken by one or more customer service agents 607 within the dataset in reaction to a customers' request to cancel service—47% of the events were handled by asking "questions" (such as to determine the reason for the desire to cancel), 10% calls were handled by offering a free receiver, and 3% of the calls were handled by heeding the request to cancel and carrying out the action. Further, as demonstrated in the figure, additional analysis can be provided for any given set, or flow, of themes within a dataset. FIG. 6 provides the exemplary data of "estimated impact", which is the estimated financial result of the actions taken by the agent. On the other hand, the free receiver may be a costly option in order to retain the customer. Other agents or other interactions may reveal other techniques or solutions that are less costly, but also effective at preventing customer cancellations. In an effort to prevent cancellations in a cost-effective manner, agents may be instructed to offer these solutions prior to offering the free receiver.

The call center application is just one exemplary application of the disclosed funnel data analysis applied in one type of industry. This funnel analysis could be applied to any type of dataset utilizing that user's ontology to surface a multitude of analytical data that could be leveraged by a company to improve its work flows. A company may, for example, utilize this funnel analysis to construct best practice guidance for its employees. Alternatively or additionally, this funnel analysis could be conducted real-time to provide guidance to user employees regarding solutions to the problems they are facing.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of funnel analysis, the method comprising:
   defining at least one flow that is representative of a series of sequential events appearing in an identifiable order, the events comprising at least one speech event, at least one Data Processing Activity (DPA) event, and at least one Computer Telephone Integration (CTI) event;
   receiving customer service interaction data comprising communication data, DPA metadata, and CTI metadata, wherein the customer service interaction is between a customer and a customer service agent;
   applying the at least one flow to the customer service interaction data;
   determining if the customer service interaction data matches the at least one flow; and
   producing an automated indication based upon the determination, wherein producing the automated indication includes presenting automated guidance in real-time to the customer service agent upon the determination identifying a lack of a match to the at least one defined flow.

2. The method of claim 1, wherein the identifiable order of sequential events of the at least one flow begins with a triggering event, wherein the triggering event is indicative of a subject of interest to be explored by the defined flow.

3. The method of claim 2, wherein the identifiable order of sequential events of the at least one flow ends with a data event representative of an outcome or resolution related to the subject of interest.

4. The method of claim 1, wherein the at least one DPA event is defined by metadata from a customer service agent's workstation.

5. The method of claim 1, wherein the at least one CTI event includes metadata that is related to communication or data processing performed by a customer service agent's workstation.

6. The method of claim 1 wherein the at least one speech event comprises at least one theme.

7. The method of claim 2, further comprising, identifying themes in the communication data.

8. A non-transitory computer-readable storage medium in which computer program instructions are stored, which instructions, when executed by a computer, cause the computer to perform the steps comprising:
   defining at least one flow that is representative of a series of sequential events appearing in an identifiable order, the events comprising at least one speech event, at least one Data Processing Activity (DPA) event, and at least one Computer Telephone Integration (CTI) event;
   receiving customer service interaction data comprising communication data, DPA metadata, and CTI metadata;
   applying the at least one flow to the customer service interaction data;
   determining if the customer service interaction data matches the at least one flow; and
   producing an automated indication based upon the determination, wherein producing the automated indication includes presenting automated guidance in real-time to the customer service agent upon the determination identifying a lack of a match to the at least one defined flow.

9. The non-transitory computer-readable storage medium of claim 8, wherein the identifiable order of sequential events of the at least one flow begins with a triggering event, wherein the triggering event is indicative of a subject of interest to be explored by the defined flow.

10. The non-transitory computer-readable storage medium of claim 9, wherein the identifiable order of sequential events of the at least one flow ends with a data event representative of an outcome or resolution related to the subject of interest.

11. The non-transitory computer-readable storage medium of claim 8, wherein the at least one DPA event is defined by metadata from a customer service agent's workstation.

12. The non-transitory computer-readable storage medium of claim 8, wherein the at least one CTI event includes metadata that is related to communication or data processing performed by a customer service agent's workstation.

13. The non-transitory computer-readable storage medium of claim 8, wherein the at least one speech event comprises at least one theme.

14. The non-transitory computer-readable storage medium of claim 13, wherein the instructions cause the computer to perform the additional step of identifying themes in the communication data.

15. An apparatus comprising:
a communication interface configured to receive customer service interaction data comprising communication data, DPA metadata, and CTI metadata;
a hardware processor configured to perform the steps comprising:
defining at least one flow that is representative of a series of sequential events appearing in an identifiable order, the events comprising at least one speech event, at least one Data Processing Activity (DPA) event, and at least one Computer Telephone Integration (CTI) event;
receiving customer service interaction data comprising communication data, DPA metadata, and CTI metadata;
applying the at least one flow to the customer service interaction data;
determining if the customer service interaction data matches the at least one flow; and
producing an automated indication based upon the determination, wherein producing the automated indication includes presenting automated guidance in real-time to the customer service agent upon the determination identifying a lack of a match to the at least one defined flow.

16. The apparatus of claim 15, wherein the identifiable order of sequential events of the at least one flow begins with a triggering event, wherein the triggering event is indicative of a subject of interest to be explored by the defined flow.

17. The apparatus of claim 16, wherein the identifiable order of sequential events of the at least one flow ends with a data event representative of an outcome or resolution related to the subject of interest.

18. The apparatus of claim 15, wherein the DPA events are defined by metadata from a customer service agent's workstation.

19. The apparatus of claim 15, wherein the at least one CTI event includes metadata that is related to communication or data processing performed by a customer service agent's workstation.

20. The apparatus of claim 15, wherein the at least one speech event comprises at least one theme, and wherein the instructions cause the computer to perform the additional step of identifying themes in the communication data.

* * * * *